(12) United States Patent
Chakraborty et al.

(10) Patent No.: US 12,513,545 B2
(45) Date of Patent: Dec. 30, 2025

(54) METHODS AND SYSTEMS FOR TESTING BLUETOOTH® CLASSIC WIRELESS DEVICES

(71) Applicant: Keysight Technologies, Inc., Santa Rosa, CA (US)

(72) Inventors: Kaushik Chakraborty, Loveland, CO (US); Darrin Joseph Russell, Bowie, TX (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 278 days.

(21) Appl. No.: 18/117,363

(22) Filed: Mar. 3, 2023

(65) Prior Publication Data

US 2024/0298197 A1 Sep. 5, 2024

(51) Int. Cl.
*H04W 24/08* (2009.01)
*H04W 4/80* (2018.01)

(52) U.S. Cl.
CPC ............. *H04W 24/08* (2013.01); *H04W 4/80* (2018.02)

(58) Field of Classification Search
CPC ....... H04W 4/80; H04W 24/08; H04W 24/06; H04W 8/005; H04W 84/12; H04W 24/00; H04W 24/04; H04W 24/10; H04W 24/02; H04B 17/29; H04B 17/309; H04B 17/0085; H04B 17/15; H04B 17/19; H04L 43/50; H04L 43/12; H04L 1/203; G06F 11/2733; G06F 11/273; G06F 11/2221; H04R 25/30; H04R 29/00; H04R 2420/07; G01R 31/31715; G01R 31/2834; H04M 1/24; H04M 2250/02; H04M 1/72412

See application file for complete search history.

(56) References Cited

U.S. PATENT DOCUMENTS

| 9,871,601 B2 | 1/2018 | Olgaard et al. |
| 10,575,199 B2 | 2/2020 | Chakraborty et al. |
| 10,637,589 B1 | 4/2020 | Chakraborty et al. |

(Continued)

FOREIGN PATENT DOCUMENTS

CN 115334485 A * 11/2022 ........... H04L 1/0061

OTHER PUBLICATIONS

"Assigned Numbers", Bluetooth SIG, Inc., pp. 1-393 (2023).

(Continued)

*Primary Examiner* — Olumide Ajibade Akonai

(57) ABSTRACT

A method for testing Bluetooth® Classic wireless devices includes identifying a Bluetooth® wireless device under test (DUT) by a test device. The method further includes signaling, by the test device and with the Bluetooth® wireless DUT over a Bluetooth® signaling interface, to identify at least one service provided by the Bluetooth® wireless DUT. The method further includes generating commands associated with the at least one service by the test device and based on the at least one service. The method further includes transmitting test packets including the commands to the Bluetooth® wireless DUT by the test device. The method further includes receiving, by the test device, packets including responses to a least some of the commands. The method further includes determining a performance metric of the Bluetooth® wireless DUT by the test device and based on the test packets and the packets including the responses.

18 Claims, 5 Drawing Sheets

(56) References Cited

U.S. PATENT DOCUMENTS

| | | | |
|---|---|---|---|
| 10,848,994 B1* | 11/2020 | Da Silva Miranda ........................ H04W 24/06 | |
| 11,356,875 B2 | 6/2022 | Glover | |
| 2017/0078031 A1* | 3/2017 | Olgaard ................. | H04B 17/17 |
| 2020/0008085 A1* | 1/2020 | Chakraborty ......... | H04W 24/06 |
| 2021/0306116 A1* | 9/2021 | Osmanovic .......... | H04R 29/001 |
| 2021/0306780 A1* | 9/2021 | Schobert ............ | G01R 31/2872 |
| 2021/0337330 A1* | 10/2021 | Disatnik ................. | H04M 1/24 |
| 2022/0222036 A1* | 7/2022 | Kim ....................... | H04R 3/005 |
| 2024/0251346 A1* | 7/2024 | Pochiraju .............. | H04W 36/34 |

OTHER PUBLICATIONS

"Permitted Characteristics", Bluetooth SIG, Inc., pp. 1-7 ( Sep. 2021).
"Service Discovery", Bluetooth SIG, Inc., pp. 1-11 (Sep. 2022).
"GATT Specification Supplement", Bluetooth SIG, Inc., v5, pp. 1-256 (Sep. 2021).
"Specification of the Bluetooth® System, Covered Core Package", version 4.2, Bluetooth SIG, Inc., pp. 1-2772 (Dec. 2014).
ESR06—Errata Service Release to the Bluetooth® Specification, ESR06_ESR_V10, Bluetooth SIG, Inc., pp. 1-97 (Dec. 2012).

* cited by examiner

METHODS AND SYSTEMS FOR TESTING BLUETOOTH® CLASSIC WIRELESS DEVICES

TECHNICAL FIELD

The subject matter described herein relates to testing 2.4 GHz wireless devices. More specifically, the subject matter relates to methods and systems for testing Bluetooth® Classic wireless devices.

BACKGROUND

Wireless electronic devices are configured to connect and communicate with other wireless electronic devices using radio frequency (RF) signals without requiring a physical connection. Common wireless electronic devices include Bluetooth® Classic wireless devices implementing the Bluetooth® Classic radio. The Bluetooth® Classic radio, also referred to as Bluetooth® Basic Rate/Enhanced Data Rate (BR/EDR), is a low power radio that streams data over 79 channels in the 2.4 GHz unlicensed industrial, scientific, and medical (ISM) frequency band. Testing Bluetooth® Classic wireless devices, also referred to herein as Bluetooth® wireless devices, requires that the Bluetooth® wireless devices include a test mode or test firmware for the devices to receive test commands from a test device, thus operating in a mode that is beyond the scope of the operation of the devices. However, adding firmware to implement a test mode in a Bluetooth® wireless device can be costly and not all Bluetooth® wireless devices include a test mode. There is a need for a test device configured to test a Bluetooth® wireless device using messages that are part of the device's standard operation.

SUMMARY

Methods and systems for testing Bluetooth® Classic wireless devices are disclosed. An example method for testing Bluetooth® Classic wireless devices includes identifying a Bluetooth® wireless device under test (DUT) by a test device. The method further includes signaling, by the test device and with the Bluetooth® wireless DUT over a Bluetooth® signaling interface, to identify at least one service provided by the Bluetooth® wireless DUT. The method further includes generating commands associated with the at least one service by the test device and based on the at least one service. The method further includes transmitting test packets including the commands to the Bluetooth® wireless DUT by the test device. The method further includes receiving, by the test device, packets including responses to a least some of the commands. The method further includes determining a performance metric of the Bluetooth® wireless DUT by the test device and based on the test packets and the packets including the responses.

An example system for testing Bluetooth® Classic wireless devices includes a processor, a memory communicatively connected to the processor, and a test device implemented using the processor and the memory. The test device is configured for identifying a Bluetooth® wireless DUT. The test device is further configured for signaling, with the Bluetooth® wireless DUT over a Bluetooth® signaling interface, to identify at least one service provided by the Bluetooth® wireless DUT. The test device is further configured for generating, based on the at least one service, commands associated with the at least one service. The test device is further configured for transmitting test packets including the commands to the Bluetooth® wireless DUT. The test device is further configured for receiving packets including responses to a least some of the commands. The test device is further configured for determining, based on the test packets and the packets including the responses, a performance metric of the Bluetooth® wireless DUT.

In some embodiments, identifying a Bluetooth® wireless DUT may include scanning an area for Bluetooth® wireless devices and detecting a response from the Bluetooth® wireless DUT. Signaling with the Bluetooth® wireless DUT over the Bluetooth® signaling interface may include transmitting a service discovery protocol message to the Bluetooth® wireless DUT and/or receiving at least one universally unique identifier (UUID) from the Bluetooth® wireless DUT and determining a type of the Bluetooth® wireless DUT based on the UUID. The test device may signal with the Bluetooth® wireless DUT over a wired or wireless connection. In some embodiments, determining the type of the Bluetooth® wireless DUT based on the UUID may include determining that the Bluetooth® wireless DUT comprises an audio DUT.

In some embodiments, transmitting a command to the Bluetooth® wireless DUT may include transmitting a command for adjusting a volume of the Bluetooth® wireless DUT. The test device may transmit a user-defined test audio tone to the Bluetooth® wireless DUT. Determining the type of the Bluetooth® wireless DUT may include identifying the Bluetooth® wireless DUT as a non-audio Bluetooth® device. Determining the performance metric may include determining a packet error rate (PER) of the Bluetooth® wireless DUT.

The subject matter described herein may be implemented in software in combination with hardware and/or firmware. For example, the subject matter described herein may be implemented in software executed by a processor. In one example implementation, the subject matter described herein may be implemented using a non-transitory computer readable medium having stored therein computer executable instructions that when executed by the processor of a computer control the computer to perform steps. Example computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

BRIEF DESCRIPTION OF THE DRAWINGS

The subject matter described herein will now be explained with reference to the accompanying drawings of which.

DETAILED DESCRIPTION

The subject matter described herein includes methods and systems for testing Bluetooth® wireless devices, specifically Bluetooth® Classic wireless devices. A test device may test normal operations of the Bluetooth® wireless devices and, therefore, the Bluetooth® wireless devices do not require a test mode or test firmware. The test device may find and list nearby Bluetooth® wireless devices with corresponding identifying addresses, such as Media Access Control (MAC) addresses. The test device may select a Bluetooth® wireless device intended for testing among the found devices and connect with the device. The test device may determine a type of device the selected Bluetooth® wireless device is based on identifying information, such as a universally unique identifier (UUID), received from the device. For example, the test device may determine that the Bluetooth® wireless device is an audio device or a non-audio device. The test device may identify services and/or service attributes offered by the Bluetooth® wireless device; generate one or more commands based on the type of device, services, and/or service attributes; and send test packets including the one or more commands to the Bluetooth® wireless device. The test device may determine a performance metric, such as a packet error rate (PER), of the Bluetooth® wireless DUT based on the test packets sent and responses received. Based on a determination that the Bluetooth® wireless DUT is an audio device, the test device may transmit audio signals to the Bluetooth® wireless DUT to test audio performance.

Figure 1:
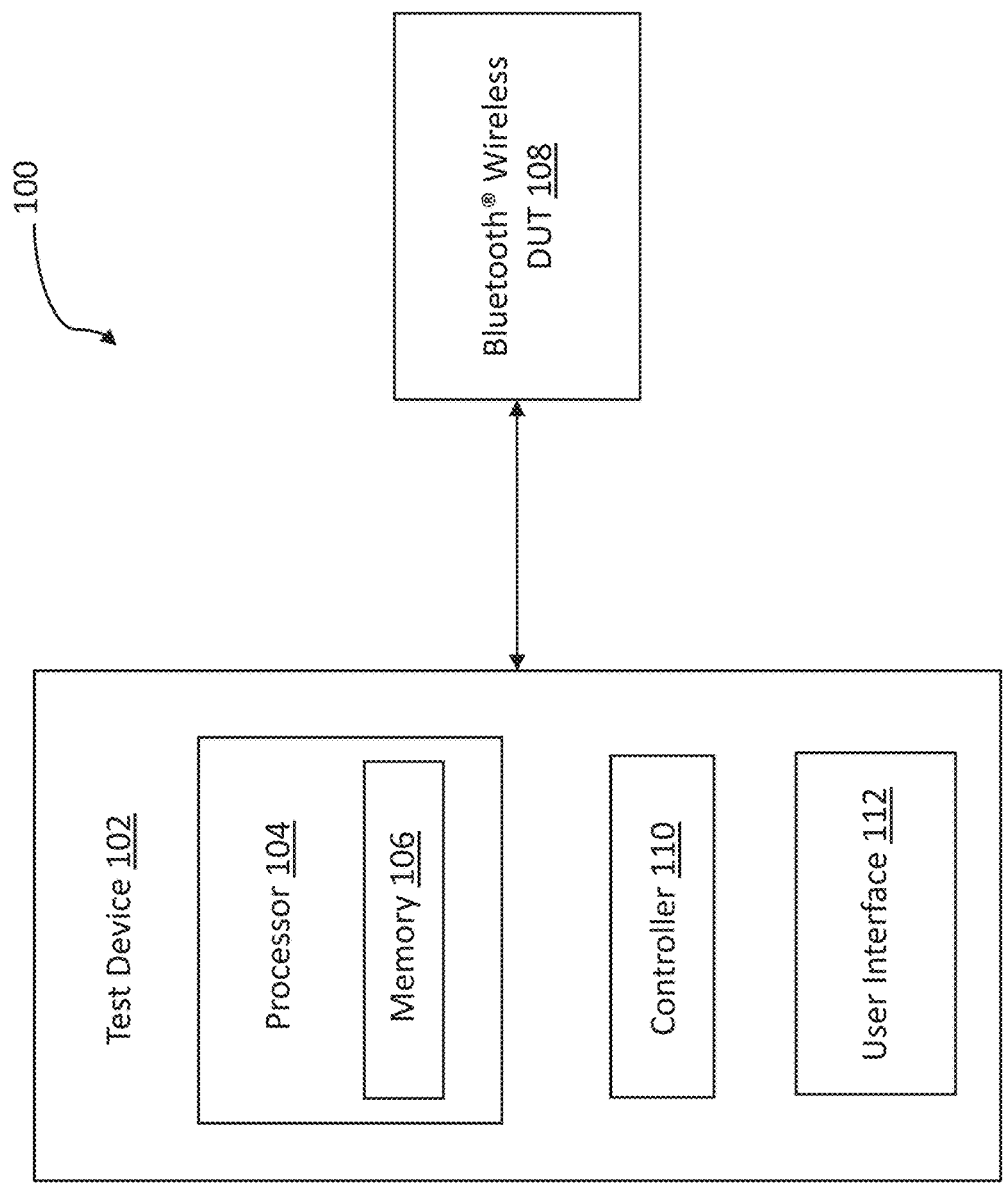
FIG. 1 is a block diagram illustrating an example system for testing Bluetooth® Classic wireless devices according to an embodiment of the presently disclosed subject matter.

FIG. 1 is a block diagram illustrating an example system 100 for testing Bluetooth® Classic wireless devices. System 100 may include a test device 102 with at least one processor 104 and memory 106. Test device 102 may include a computing device. A computing device may include, without limitation, a microcontroller, microprocessor, digital signal processor (DSP) and/or system on a chip (SoC) as described herein. A computing device may include, be included in, and/or communicate with a mobile device such as a mobile telephone or smartphone. A computing device may include a single computing device operating independently, or may include two or more computing device operating in concert, in parallel, sequentially or the like; two or more computing devices may be included together in a single computing device or in two or more computing devices. Test device 102, using processor 104 and memory 106, may be configured to perform any of the steps described herein.

Test device 102 may be configured for identifying a Bluetooth® wireless device under test (DUT) 108. Test device 102 may scan an area for Bluetooth® wireless devices and detect a response from Bluetooth® wireless DUT 108. Test device 102 may include a controller 110. Controller 110 may include a Rate/Enhanced Data Rate (BR/EDR) controller configured to communicate with Bluetooth® Classic wireless devices, such as Bluetooth® wireless DUT 108. Test device 102 may use an inquiry command, which may cause controller 110 to enter an inquiry mode for discovering nearby Bluetooth® wireless devices. Nearby Bluetooth® wireless devices, such as Bluetooth® wireless DUT 108, may respond to the inquiry command by returning identify information, for example an address of the corresponding Bluetooth® wireless device. The address may include a Media Access Control (MAC) address, Non-significant Address Part (NAP), Upper Address Part (UAP), Organizationally Unique Identifier (OUI), and/or Lower Address Part (LAP). Controller 110 may receive responses from the nearby Bluetooth® wireless devices and report the responding devices to test device 110. The inquiry mode may include an inquiry period establishing a length of time test device 102 searched for nearby Bluetooth® wireless devices. The inquiry may be halted once the inquiry period expires. In some embodiments, test device 102 may be configured to automatically repeat an inquiry command if no nearby Bluetooth® wireless devices were reported by controller 110.

Test device 102 may select and connect with one of the nearby Bluetooth® wireless devices found, such as Bluetooth® wireless DUT 108. Test device 102 may include a user interface 112 that lists the nearby Bluetooth® wireless devices found and their corresponding addresses. A user may select Bluetooth® wireless DUT 108 among the listed nearby Bluetooth® wireless devices found using the addresses, such as MAC addresses, to confirm that the selected device is the intended device. Test device 102 may initiate a create connect command. Test device 102 may include a link manager, which may send a connection request to Bluetooth® wireless DUT 108 to establish a connection with the Bluetooth® wireless DUT 108. The connection may include an Asynchronous Connection Less (ACL) connection for general data frame or Synchronous Connection Oriented (SCO) for synchronous audio frame. If the connection request is for an ACL connection, Bluetooth® wireless DUT 108 may respond with an Accept_Connection_Request command. If the connection request is for an SCO connection, Bluetooth® wireless DUT 108 may respond with an Accept_Synchronous_Connection_Request command. Test device 102 may receive a connection complete event indicating that the connection with Bluetooth® wireless DUT 108 has been established. Test device 102 may include a Host Controller Interface (HCI) configured for providing a uniform interface method of accessing a Bluetooth® wireless device's capabilities.

Test device 102 may authenticate Bluetooth® wireless DUT 108. Test device 102 and/or Bluetooth® wireless DUT 108 may generate and send a Link Manager Protocol (LMP) random number with LMP_au_rand protocol data unit (PDU) to the other device, which may calculate a response based on the random number, a shared key, and a Bluetooth® address of the responding device. If the sending device receives a correct response, then Bluetooth® wireless DUT 108 is authenticated. Test device 102 may pair with Bluetooth® wireless DUT 108 if the devices do not share a common key. Test device 102 or Bluetooth® wireless DUT 108 may send a pairing request with LMP_in_rand PDU and receive from the other device an LMP_accepted PDU, upon which test device 102 and Bluetooth® wireless DUT 108 calculate an initialization key based on a Bluetooth® address of the responding device. Test device 102 and Bluetooth® wireless DUT 108 may create a link key and may authenticate that both devices have created the same link key.

Figure 2:
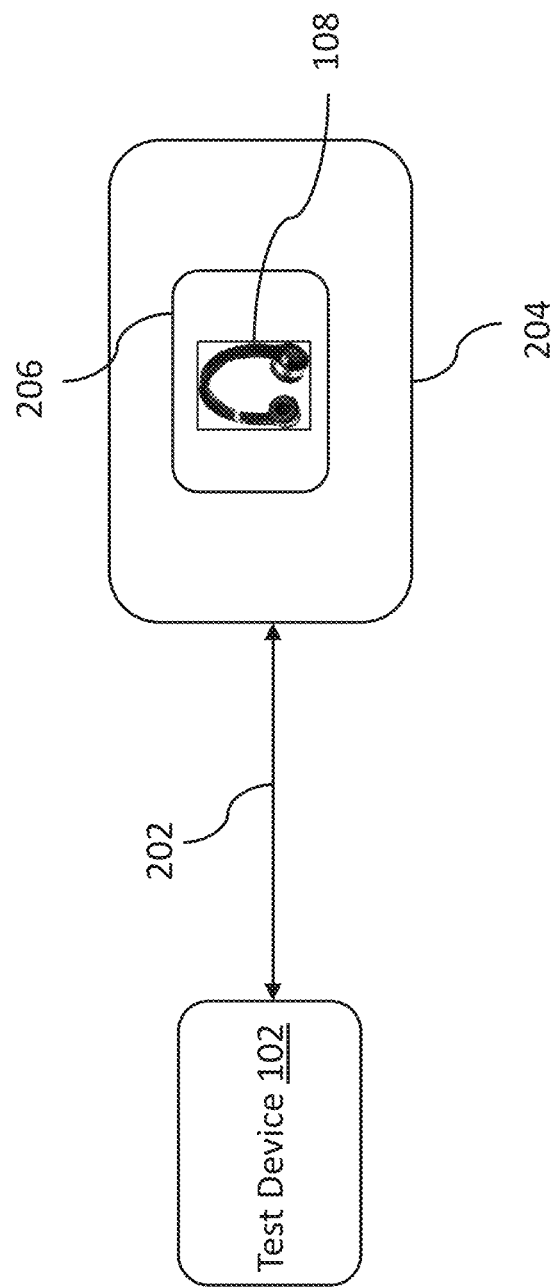
FIG. 2 is a block diagram illustrating an example system for testing Bluetooth® Classic wireless devices in a test environment according to an embodiment of the presently disclosed subject matter.

Test device 102 may signal, with Bluetooth® wireless DUT 108 over a Bluetooth® signaling interface, such as HCI, to identify at least one service provided by the Bluetooth® wireless DUT 108. A service may include providing information, performing an action, or controlling a resource on behalf of another device, such as test device 102. Test device 102 may signal with Bluetooth® wireless DUT 108 over a wired or wireless connection. FIG. 2 is a block diagram illustrating an example system for testing Bluetooth® wireless devices in a test environment. With reference to FIG. 2, a wired connection may include a physical connection between test device 102 and Bluetooth® wireless DUT 108 such as by a cable 202, for example a Subminiature version A (SMA) connector cable. In some embodiments, test device 102 may be configured to test Bluetooth® wireless DUT 108 situated within a radio frequency (RF) shield box 204, wherein cable 202 runs from the test device 102 to RF shield box 204 to the Bluetooth® wireless DUT 108, wherein the cable 202 or the RF shield box 204 connects to a patch antenna 206 on the Bluetooth® wireless DUT 108.

Referring again to FIG. 1, test device 102 may transmit a Service Discovery Protocol (SDP) message to Bluetooth® wireless DUT 108. Test device 102 may transmit an SDP request message to Bluetooth® wireless DUT 108 and receive an SDP response message from the Bluetooth® wireless DUT 108. The SDP is a protocol for an application in a client device, such as test device 102, to discover which services are available from a Bluetooth® wireless device and to determine service attributes of the available services. Each service attribute describes a single characteristic of a service. A service attribute of an available service may identify a type or class of service offered by the Bluetooth® wireless device and the mechanism or protocol information needed to utilize the service. The SDP request message and the SDP response message may each consist of one request protocol data unit (PDU) comprising a header and parameters. If the size of an SDP response requires multiple PDUs, test device 102 may receive a partial SDP response from Bluetooth® wireless DUT 108 with a continuation state parameter. Test device 102 may send a subsequent message to Bluetooth® wireless DUT 108 with the continuation state parameter to receive the next portion of the complete SDP response.

A service attribute may include an attribute identifier (ID) and an attribute value. An attribute ID is a 16-bit unsigned integer that distinguishes each service attribute from other service attributes within a service record. An attribute ID is unique only within each service class. An attribute value is a variable length field whose meaning is determined by the attribute ID associated with it and by the service class of the service record in which the attribute is contained. In the Service Discovery Protocol, an attribute ID and an attribute value are each represented as a data element.

Each service is an instance of a service class. The service class definition provides the definitions of all attributes contained in service records that represent instances of that class. Each attribute definition specifies the numeric value of the attribute ID, the intended use of the attribute value, and the format of the attribute value. A service record contains attributes that are specific to a service class as well as universal attributes that are common to all services. Each service class is assigned a unique identifier represented as a universally unique identifier (UUID), which is contained in the attribute value for the ServiceClassIDList service attribute of a service.

In some embodiments, test device 102 may search for a specific service based on a specific attribute. Test device 102 may retrieve a service record handle from Bluetooth® wireless DUT 108 using a UUID of a service attribute that is within the service record. With the service record handle, test device 102 may request from Bluetooth® wireless DUT 108 an attribute value of a specific service attribute reflecting the desired characteristic. For example, a user may desire to find a service attribute offered by Bluetooth® wireless DUT 108 that provides audio. In some embodiments, test device 102 may send to Bluetooth® wireless DUT 108 an SDP_ServiceSearchRequest to locate service records that match at least a search parameter in the request. The ServiceSearchRequest may identify a specific service or service type, such as for example a ServiceClassID, with a UUID. Test device 102 may receive an SDP_ServiceSearchResponse from Bluetooth® wireless DUT 108 returning a handle for each identified service matching the at least a search parameter in the request.

Test device 102 may use a service handle, such as a service handle received in an SDP_ServiceSearchResponse, to obtain a list of service attributes for the identified service. Test device 102 may send to Bluetooth® wireless DUT 108 an SDP_ServiceAttributeRequest with the service handle, specifying the ProtocolDescriptorList attribute ID as the only service attribute requested. Bluetooth® wireless DUT 108 may return an SDP_ServiceAttributeResponse with the ProtocolDescriptorList for the service. The ProtocolDescriptorList may include service attributes and corresponding protocol-specific parameters. In some embodiments, test device 102 may browse services offered by Bluetooth® wireless DUT 108. Test device 102 may use the BrowseGroupList service attribute to find a service offered by Bluetooth® wireless DUT 108 according to group, such as service class.

Test device 102 may receive at least one universally unique identifier (UUID) from Bluetooth® wireless DUT 108 and determine a type of Bluetooth® wireless DUT 108 based on the UUID. The UUID may be a full 128-bit value or a shortened alias value representing the full a full 128-bit value, for example a 16-bit value or a 32-bit value. The UUID may identify the type of device Bluetooth® wireless DUT 108 is. The received UUID may identify a service and/or service attribute of Bluetooth® wireless DUT 108. In SDP response from Bluetooth® wireless DUT 108, test device 102 may receive a service record including a list of services and the corresponding service attributes offered by Bluetooth® wireless DUT 108. A type of Bluetooth® wireless DUT 108 may include a switching device, an audio device, an audio/visual device, and the like.

Test device 102 may determine that Bluetooth® wireless DUT 108 comprises an audio DUT. Test device 102 may have audio capability based on an audio-related profile of the Bluetooth® wireless DUT 108, such as an advanced audio distribution profile (A2DP) or an audio/video remote control profile (AVRCP). Test device 102 may identify a UUID for an audio service, such as the volume control service UUID 0x1844, published audio capabilities service UUID 0x1850, or basic audio announcement service UUID 0x1851. Test device 102 may identify a UUID for an audio characteristic, for example the audio output description UUID 0x2B83 or a content control ID (CCID) characteristic. A CCID characteristic includes a value that uniquely identifies an instance of a service that controls or provides status information on an audio-related feature. Test device 102 may identify Bluetooth® wireless DUT 108 as a non-audio Bluetooth® device such as a switching device. Switching devices may include a keyboard, mouse, Bluetooth® controlled light switch, temperature sensor, humidity sensor, heart rate monitor, and the like.

Test device 102 may generate, based on the at least one service, commands associated with the at least one service.

Commands may include a command to change an electrical path, return specified information, adjust volume, turn off or on, and the like. Specific information requested may include, for example, identifying information of Bluetooth® wireless DUT 108 such as device type, serial number, and model number. In some embodiments, commands may include commands to take and/or return a current measurement such as temperature, humidity, and heart rate. Commands may also include commands not associated with the at least one service, such as an inquiry command, connection request, authentication request, pairing request, service discovery request, and attribute discovery request. Test device 102 may transmit test packets including the commands to Bluetooth® wireless DUT 108. For example, test device 102 may transmit a command for adjusting a volume of Bluetooth® wireless DUT 108. Test device 102 may send a specified amount of test packets to Bluetooth® wireless DUT 108. In some embodiments, test device 102 may adjust an amount of test packets sent based on user input.

Test device 102 may be configured for receiving packets including responses to at least some of the commands in test packets. Packets may include PDU responses described herein. Test device 102 may count the amount of test packets sent, the amount of packets received including responses, and/or the amount of error messages received. Test device 102 may determine a performance metric of Bluetooth® wireless DUT 108 based on test packets and the received packets including the responses. The performance metric may include a packet error rate (PER) of Bluetooth® wireless DUT 108. The performance metric may be based on error packets received from Bluetooth® wireless DUT 108 and/or dropped test packets sent by test device 102. Test device 102 may determine a test packet is dropped when a lapsed time since the test packet transmission exceeds a threshold time, for example 150 microseconds. In some embodiments, test device 102 may receive user input to adjust the threshold time.

Figure 3:
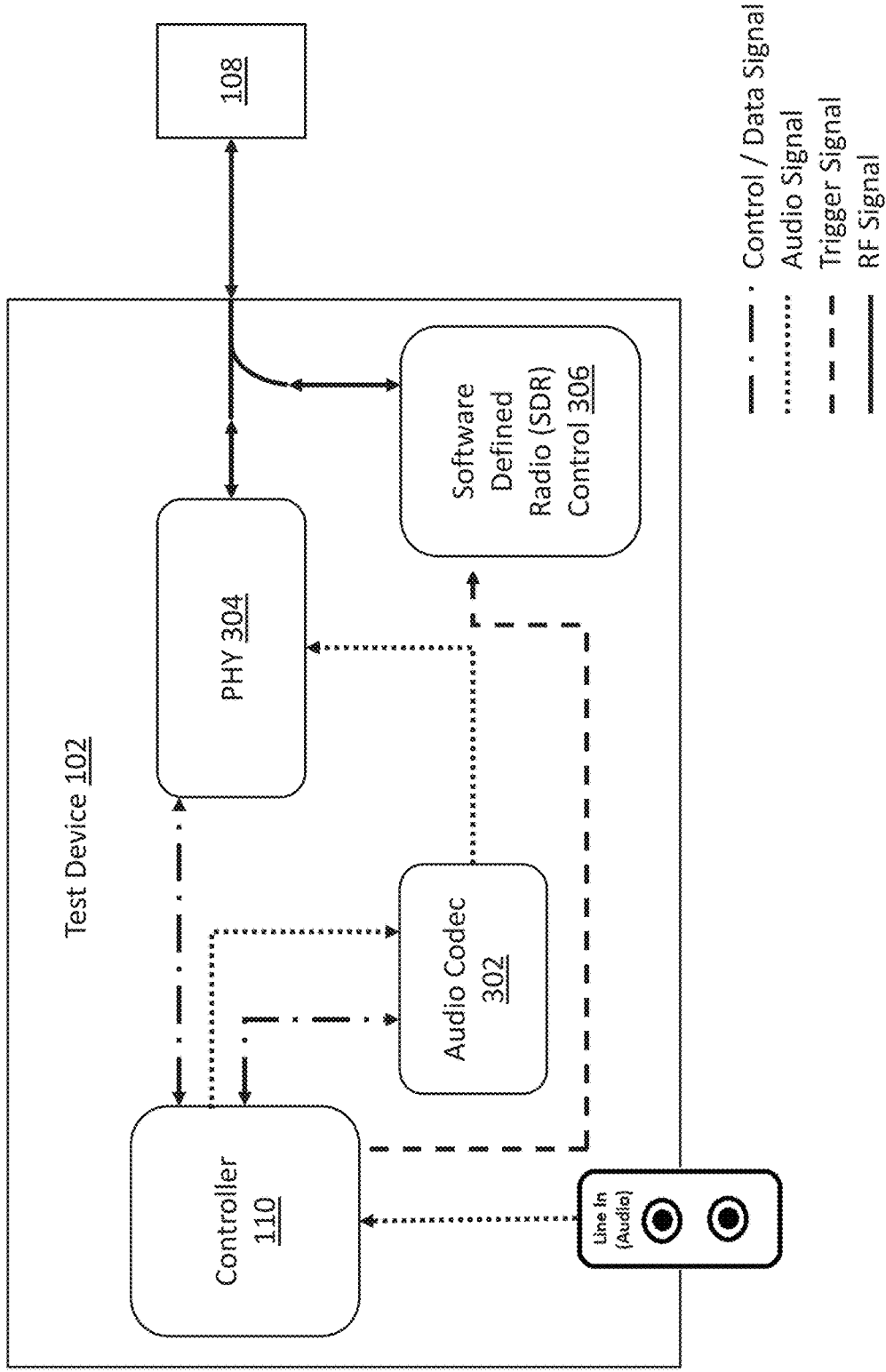
FIG. 3 is a schematic view of an example system for testing Bluetooth® Classic wireless devices according to an embodiment of the presently disclosed subject matter.

FIG. 3 is a schematic view of an example system for testing Bluetooth® wireless devices. Now referring to FIG. 3, test device 102 may transmit at least a test audio tone to Bluetooth® wireless DUT 108. In some embodiments, test device 102 may transmit two or more test audio tones to Bluetooth® wireless DUT 108. The at least a test audio tone may include one or more predefined tones, for example 1 KHz and 5 KHz. The at least a test audio tone may be user-defined. Test device 102 may receive one or more tones from a user by user interface 112, shown in FIG. 1, to transmit to Bluetooth® wireless DUT 108 for testing. Test device 102 may include a digital to analog (DAC) channel to carry the at least a test audio tone for monophonic sound transmission. In some embodiments, test device 102 may include two or more DAC channels for stereophonic sound transmission. In some embodiments, test device 102 may include two, three, four, or more DAC channels. Test device 102 may sample the at least a test audio tone and send an audio signal to Bluetooth® wireless DUT 108 of the at least a test audio tone. Controller 110 may include a microcontroller. In some embodiments, controller 110 includes processor 104 and/or memory 106. Controller 110 may receive one or more audio signals of the at least a test audio tone from an audio line-in. Controller 110 may be configured for transmitting via the at least a DAC channel the one or more audio signals to an audio codec 302 in test device 102. Audio codec 302 may receive the one or more audio signals of the at least a test audio tone and convert the one or more audio signals each to a pulse-code modulation (PCM) signal via an electrical serial interface, such as Integrated Inter-IC Sound Bus (I2S). A physical layer (PHY) 304 of Bluetooth® wireless DUT 108 may convert the PCM signal to Bluetooth® Classic radio. Test device 102 may transmit the at least a test audio tone signal to Bluetooth® wireless DUT 108 wirelessly or with a wired connection by Bluetooth® Classic radio. Controller 110 may control and communicate a data signal to PHY 304 and audio codec 302. Test device 102 may include a software defined radio (SDR) control 306 as an optional component for recording radio transmissions from DUT 108. Test device 102 may send a trigger signal to SDR control 306 to begin recording radio transmissions from DUT 108.

Figure 4:
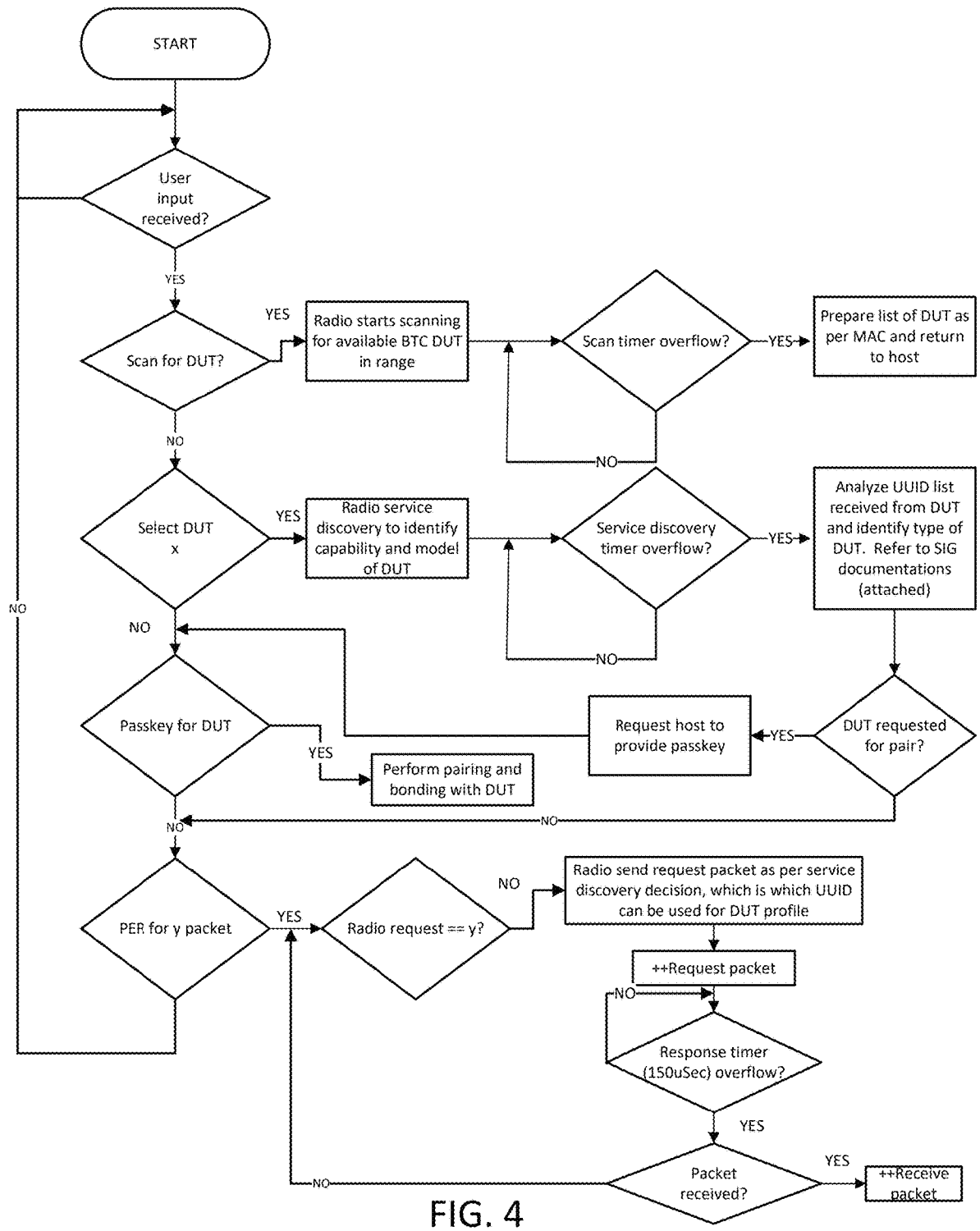
FIG. 4 is a flow diagram illustrating an example method for testing Bluetooth® Classic wireless devices according to an embodiment of the presently disclosed subject matter.
Figure 5:
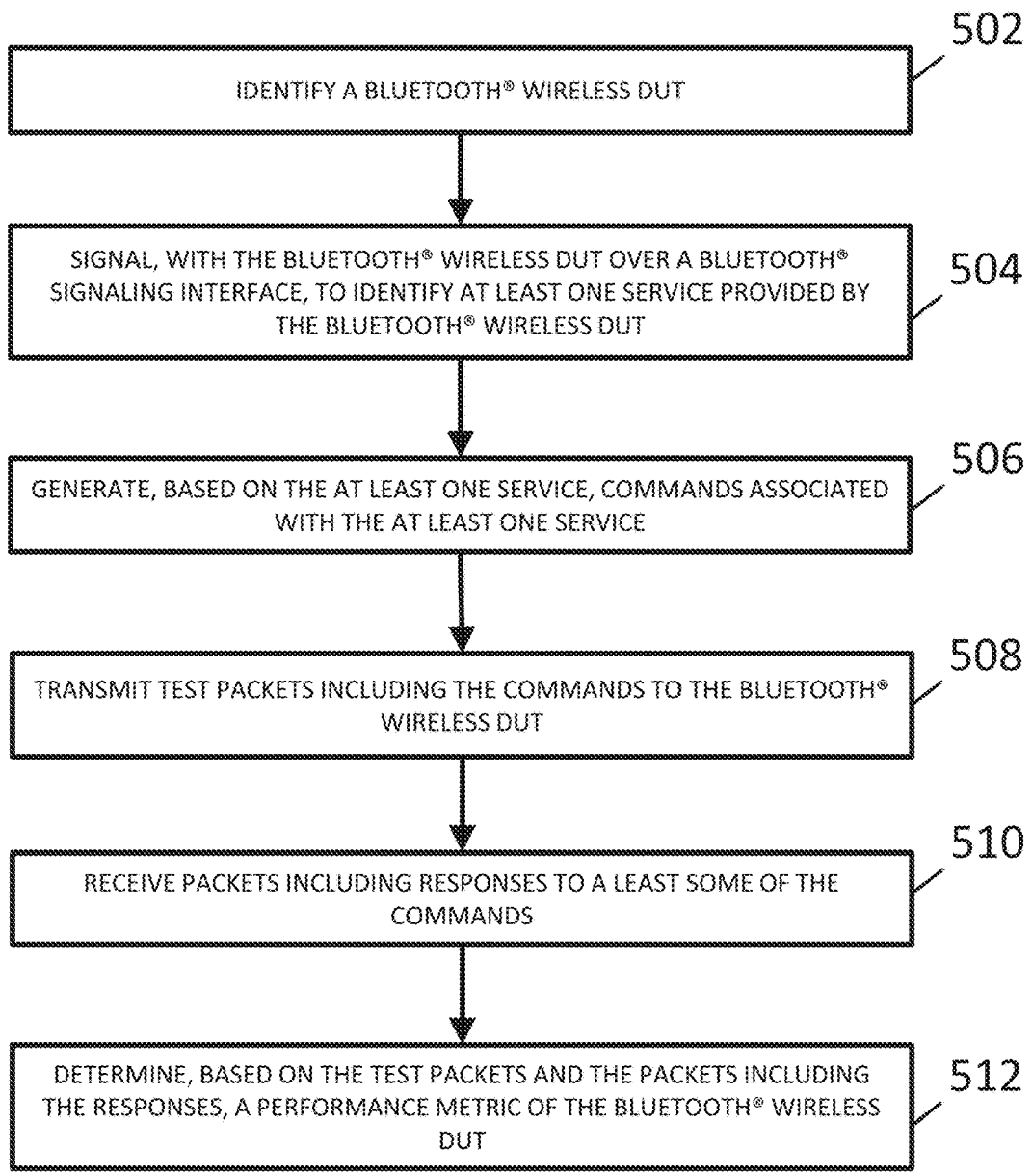
FIG. 5 is a flow diagram illustrating an example method for testing Bluetooth® Classic wireless devices according to an embodiment of the presently disclosed subject matter.

FIG. 4 is a flow diagram illustrating an example method for testing Bluetooth® wireless devices. Referring to FIG. 5, test device 102 receives user input to scan for Bluetooth® wireless DUT 108, scans for available Bluetooth® Classic devices within range of test device 108, receives responses from any Bluetooth® wireless devices within range, and prepares a list of found devices and corresponding addresses, such as MAC address, of the devices. If a scan timer ends and no devices are found, test device 102 may repeat the scan. Instead of receiving input to scan for devices, test device 102 receive user input selecting Bluetooth® wireless DUT 108. Test device 102 may commence a radio service discovery to identify the capability and available services offered by Bluetooth® wireless DUT 108, which may return a UUID list from the Bluetooth® wireless DUT 108 and/or identify the type of Bluetooth® wireless DUT 108. If the radio service discovery timer ends without receiving a UUID list, test device 102 may repeat the radio service discovery.

Test device 102 may pair and bond with Bluetooth® wireless DUT 108 if the test device has a key for the Bluetooth® wireless DUT 108. Bluetooth® wireless DUT 108 may request test device 102 to provide a key for pairing. Test device 102 may test Bluetooth® wireless DUT 108 with a specific amount of test packets, such as "y packets." Test device 102, based on a service selected from the service discovery, may send to Bluetooth® wireless DUT 108 request packets. Once the determined of test packets have been sent, test device 102 may determine the PER from the amount of test packets sent and the amount of responses received. If a response to a test packet was not received and the lapsed time since transmission exceeds the threshold time, then test device 102 may determine that the test packet has been dropped.

FIG. 5 is a flow chart of example method 500 for testing Bluetooth® wireless devices. Referring to FIG. 5, in step 502, a test device identifies a Bluetooth® wireless device under test (DUT). The test device may scan an area for Bluetooth® wireless devices and detect a response from the Bluetooth® wireless DUT. The test device may signal with the Bluetooth® wireless DUT over a wired or wireless connection.

In step 504, the test device signals, with the Bluetooth® wireless DUT over a Bluetooth® signaling interface, to identify at least one service provided by the Bluetooth® wireless DUT. The test device may transmit a service discovery protocol message to the Bluetooth® wireless DUT and/or receive at least one universally unique identifier (UUID) from the Bluetooth® wireless DUT and determine a type of the Bluetooth® wireless DUT based on the UUID. The test device may determine that the Bluetooth® wireless DUT comprises an audio DUT. The test device may identify the Bluetooth® wireless DUT as a non-audio Bluetooth® device.

In step 506, the test device generates, based on the at least one service, commands associated with the at least one service. In step 508, the test device transmits test packets including the commands to the Bluetooth® wireless DUT. The test device may transmit a command for adjusting a volume of the Bluetooth® wireless DUT. The test device may transmit a user-defined test audio tone to the Bluetooth® wireless DUT.

In step 510, the test device receives packets including responses to a least some of the commands. In step 512, the test device determines, based on the test packets and the packets including the responses, a performance metric of the Bluetooth® wireless DUT. The performance metric may include a packet error rate (PER) of the Bluetooth® wireless DUT.

It will be appreciated that method 500 is for illustrative purposes and that different and/or additional actions may be used. It will also be appreciated that various actions described herein may occur in a different order or sequence. It is understood that Bluetooth® wireless DUT 108 may be interchangeable with a Bluetooth® wireless system under test (SUT).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

Each of the following references is incorporated herein by reference in its entirety:

REFERENCES

*Specification of the Bluetooth® System: Covered Core Package*, version 4.2. Bluetooth SIG, Inc. Dec. 2, 2014.
*Service Discovery*. Bluetooth SIG, Inc. Sep. 21, 2022.
*GATT Specification Supplement: Bluetooth Specification*, version 5. Bluetooth SIG, Inc. Sep. 14, 2021.

What is claimed is:

1. A method for testing Bluetooth® Classic wireless devices, the method comprising:
   identifying, by a test device, a Bluetooth® Classic wireless device under test (DUT);
   signaling, by the test device and with the Bluetooth® Classic wireless DUT over a Bluetooth® Classic signaling interface, to identify at least one service provided by the Bluetooth® Classic wireless DUT;
   generating, by the test device and based on the at least one service, commands associated with the at least one service;
   transmitting, by the test device and over the Bluetooth® Classic signaling interface, test packets including the commands to the Bluetooth® Classic wireless DUT;
   receiving, by the test device, packets including responses to at least some of the commands;
   determining, by the test device and based on the test packets and the packets including the responses, a performance metric of the Bluetooth® Classic wireless DUT; and
   recording, by a software-defined radio (SDR) control of the test device, audio transmissions of the Bluetooth® Classic wireless DUT.

2. The method of claim 1 wherein identifying a Bluetooth® Classic wireless DUT comprises:
   scanning an area for Bluetooth® Classic wireless devices; and
   detecting a response from the Bluetooth® Classic wireless DUT.

3. The method of claim 1 wherein signaling with the Bluetooth® Classic wireless DUT over the Bluetooth® Classic signaling interface includes transmitting a service discovery protocol message to the Bluetooth® Classic wireless DUT.

4. The method of claim 1 wherein signaling with the Bluetooth® Classic wireless DUT over the Bluetooth® signaling interface includes receiving at least one universally unique identifier (UUID) from the Bluetooth® Classic wireless DUT and determining a type of the Bluetooth® Classic wireless DUT based on the UUID.

5. The method of claim 4 wherein determining the type of the Bluetooth® Classic wireless DUT based on the UUID includes determining that the Bluetooth® Classic wireless DUT comprises an audio DUT.

6. The method of claim 5 wherein transmitting a command to the Bluetooth® Classic wireless DUT includes transmitting a command for adjusting a volume of the Bluetooth® Classic wireless DUT.

7. The method of claim 5 comprising transmitting, by the test device, a user-defined test audio tone to the Bluetooth® Classic wireless DUT.

8. The method of claim 1 wherein signaling with the Bluetooth® Classic wireless DUT comprises signaling with the Bluetooth® Classic wireless DUT over a wired or wireless connection.

9. The method of claim 1 wherein determining the performance metric includes determining a packet error rate (PER) of the Bluetooth® Classic wireless DUT.

10. A system for testing Bluetooth® Classic wireless devices, the system comprising:
    a processor;
    a memory communicatively connected to the processor; and
    a test device implemented using the processor and the memory, wherein the test device is configured for:
    identifying a Bluetooth® Classic wireless device under test (DUT);
    signaling, with the Bluetooth® Classic wireless DUT over a Bluetooth® Classic signaling interface, to identify at least one service provided by the Bluetooth® Classic wireless DUT;
    generating, based on the at least one service, commands associated with the at least one service;
    transmitting, over the Bluetooth® Classic signaling interface, test packets including the commands to the Bluetooth® Classic wireless DUT;
    receiving packets including responses to at least some of the commands; and
    determining, based on the test packets and the packets including the responses, a performance metric of the Bluetooth® Classic wireless DUT, wherein the test device includes a software-defined radio (SDR) control for recording audio transmissions of the Bluetooth® Classic wireless DUT.

11. The system of claim 10 wherein identifying a Bluetooth® Classic wireless DUT comprises:
    scanning an area for Bluetooth® Classic wireless devices; and
    detecting a response from the Bluetooth® Classic wireless DUT.

12. The system of claim 10 wherein signaling with the Bluetooth® Classic wireless DUT over the Bluetooth®

Classic signaling interface includes transmitting a service discovery protocol message to the Bluetooth® Classic wireless DUT.

13. The system of claim 10 wherein signaling with the Bluetooth® Classic wireless DUT over the Bluetooth® Classic signaling interface includes receiving at least one universally unique identifier (UUID) from the Bluetooth® Classic wireless DUT and determining a type of the Bluetooth® Classic wireless DUT based on the UUID.

14. The system of claim 13 wherein determining the type of the Bluetooth® Classic wireless DUT based on the UUID includes determining that the Bluetooth® Classic wireless DUT comprises an audio DUT.

15. The system of claim 14 wherein transmitting a command to the Bluetooth® Classic wireless DUT includes transmitting a command for adjusting a volume of the Bluetooth® Classic wireless DUT.

16. The system of claim 14 comprising transmitting a user-defined test audio tone to the Bluetooth® Classic wireless DUT.

17. The system of claim 10 wherein signaling with the Bluetooth® Classic wireless DUT comprises signaling with the Bluetooth® Classic wireless DUT over a wired or wireless connection.

18. The system of claim 10 wherein determining the performance metric includes determining a packet error rate (PER) of the Bluetooth® Classic wireless DUT.

* * * * *